United States Patent [19]

Nakata et al.

[11] Patent Number: 5,071,907

[45] Date of Patent: Dec. 10, 1991

[54] POLYARYLENE SULFIDE RESIN COMPOSITION

[75] Inventors: Akira Nakata; Naoki Yamamoto; Hiroshi Mori, all of Otake; Takuya Ueno, Kobe, all of Japan

[73] Assignee: Mitsubishi Rayon Co., Ltd., Tokyo, Japan

[21] Appl. No.: 470,348

[22] Filed: Jan. 25, 1990

[30] Foreign Application Priority Data

Jan. 30, 1989 [JP] Japan ................................. 1-021837

[51] Int. Cl.$^5$ ...................... C08G 18/61; C08L 81/04; C08L 83/06
[52] U.S. Cl. .................................. 524/588; 525/474; 525/477; 524/609
[58] Field of Search ................ 525/474, 477; 524/588, 524/609

[56] References Cited

U.S. PATENT DOCUMENTS 4,581,411  4/1986  Liang et al. .......................... 525/189
4,797,448  1/1989  Liang .................................. 525/106

FOREIGN PATENT DOCUMENTS 0142825  5/1985  European Pat. Off. .

OTHER PUBLICATIONS

Annex to the European Search Report on European Patent Application No. EP 90 10 1520.

Primary Examiner—John C. Bleutge
Assistant Examiner—Helen F. Lee
Attorney, Agent, or Firm—Cushman, Darby & Cushman

[57] ABSTRACT

A polyarylene sulfide resin composition obtainable by mixing (A) 99 to 60 parts by weight of a polyarylene sulfide resin,
(B) 1 to 40 parts by weight of a polyorganosiloxane rubber,
(C) 0.01 to 10 parts by weight, based on 100 parts by weight of the total weight of the components (A) and (B), of an organosilane compound having an isocyanate group, and
(D) 0 to 300 wt. %, based on the total weight of the components (A), (B) and (C), of a filler, and then reacting these components. The polyarylene sulfide resin composition of the present invention has excellent impact resistance and is used in electrical and electronic parts such as surface mounting connectors requiring heat resistance and toughness, as well as in mechanical parts, etc.

6 Claims, No Drawings

POLYARYLENE SULFIDE RESIN COMPOSITION

The present invention relates to a polyarylene sulfide resin composition.

Application fields for the polyarylene sulfide resin composition of the present invention include electrical and electronic parts, particularly surface mounting connectors requiring heat resistance and toughness, as well as mechanical parts, etc.

Polyarylene sulfide resins are recently attracting attention as engineering plastics having excellent heat resistance and chemical resistance.

The conventional polyarylene sulfide resins, however, have drawbacks that they are poor in ductility and fragile.

One method for improving such polyarylene sulfide resins lacking impact resistance is to blend a fibrous filler such as glass fiber, etc. However, the improvement of impact resistance by this method is not satisfactory, there being a demand for the development of higher-level impact resistance.

In the situation like this, there have been proposed various methods for improving the impact resistance of the polyarylene sulfide resins. For example, there are a method of blending the resins with a block copolymer of styrene and butadiene or high-impact polystyrene, as disclosed in Japanese Patent Application Kokai No. 56-118456, and a method of incorporating a polymeric rubber such as silicone rubber, EPR, EPDM, etc. into the resins, as disclosed in Japanese Patent Application Kokai No. 60-120753.

However, the block copolymer of styrene or high-impact polystyrene with butadiene is low in heat resistance. On the other hand, though the polyarylene sulfide resins have excellent heat resistance, it has a molding temperature as high as 300° C. or more, so that such a block copolymer as described above is subject to thermal deterioration under such a molding temperature. As a result, there has been a problem that molded products having excellent performances and surface appearance are difficult to obtain. Further, the method of blending the resins with silicone rubber of EP rubber with an extruder, because of poor incompatibility between the resins and rubber, cannot uniformly disperse the rubber in the resins. The molded product obtained, therefore, were such that a pearly luster is easy to come out on the surface and besides the impact resistance also has not been sufficiently improved.

In view of such a situation, the present inventors have eagerly studied a method for giving excellent impact resistance to a polyarylene sulfide resin without remarkably injuring excellent heat resistance and mechanical properties inherent to the polyarylene sulfide resin and lowering the appearance of the surface of molded products. As a result, the present inventors have found that, by blending the polyarylene sulfide resin with a polyorganosiloxane rubber as a rubber component and an organosilane compound having a particular functional group, and then reacting this organosilane compound, the impact strength of the polyarylene sulfide resin can remarkably be improved without a large reduction in the excellent performances inherent to the resin. The present inventors thus attained to the present invention.

The present invention relates to a polyarylene sulfide resin composition obtainable by mixing (A) 99 to 60 parts by weight of a polyarylene sulfide resin, (B) 1 to 40 parts by weight of a polyorganosiloxane rubber, (C) 0.01 to 10 parts by weight, based on 100 parts by weight of the total weight of the components (A) and (B), of an organosilane compound having an isocyanate group, and (D) 0 to 300 wt. %, based on the total weight of the components (A), (B) and (C), of a filler, and then reacting these components.

An object of the present invention is to provide a polyarylene sulfide resin excellent in impact resistance.

Other objects and advantages of the invention will become apparent from the following description.

The polyarylene sulfide resin used in the present invention is a polymer having as a main constituent unit a repeating unit represented by the formula,

wherein Ar represents

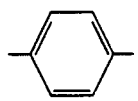

or

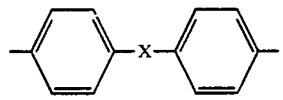

(in which X represents —SO$_2$—, —CO—, —O— or an alkylene group of which the main chain has 5 or less carbon atoms and may have 0 to 2 methyl side chains bonded thereto) or the above aromatic ring having 1 to 3 halogen atoms or methyl groups as a substituent(s) or the mixture thereof. Among the polyarylene sulfide resins described above, polyphenylene sulfide is more preferably used. These polyphenylene sulfide resins can preferably be used in any of a heat-crosslinked form and a linear form.

The polyorganosiloxane rubber used in the present invention comprises as its constituents a linear polyorganosiloxane and a crosslinkable component.

The monomer giving a linear polyorganosiloxane includes hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, etc. These organosiloxanes are used alone or in admixture of two or more.

The monomer giving a crosslinkable component includes trifunctional or tetrafunctional siloxane monomers such as for example trimethoxymethylsilane, triethoxyphenylsilane, tetramethoxysilane, tetraethoxysilane, tetrabutoxysilane, etc. These monomers may be used alone or in combination. The weight ratio of the monomer giving the linear polyorganosiloxane and the monomer giving the crosslinkable component constituting the polyorganosiloxane rubber is as follows: The proportion of the monomer giving the linear polyorganosiloxane is 50 wt. % or more, preferably 70 wt. % or more, and that of the monomer giving the crosslinkable component is preferably 0.2 to 30 wt. %.

The polyorganosiloxane rubber used in the present invention is obtained by copolymerizing the above two components.

Further, it is desirable that the polyorganosiloxane rubber used in the present invention has a degree of swelling of 3 to 50 measured by immersing in toluene. The degree of swelling referred to herein means the proportion of the weight of toluene absorbed in the polyorganosiloxane rubber when this rubber is immersed in toluene and saturated therewith at 25° C. The degree of swelling can be controlled by the kind and amount of the monomer giving the crosslinkable component to be copolymerized. When the degree of swelling is less than 3, development of rubber elasticity tends to become difficult. When the degree of swelling exceeds 50, it tends to become difficult to keep a rubbery form. In either case, a sufficient improvement in the impact resistance of the polyarylene sulfide resin composition tends to become difficult.

A method for producing the polyorganosiloxane rubber using these monomers is disclosed in U.S. Pat. No. 2,891,920 and U.S. Pat. No. 3,294,725. That is, for producing the polyorganosiloxane rubber, it is desirable to copolymerize the above two monomers by shear-mixing a mixture of these monomers together with water in the presence of an emulsifier.

Using alkylbenzenesulfonic acid as an emulsifier is desirable, because this acid acts also to initiate the polymerization of organosiloxane. Further, it is desirable to use metal alkylbenzenesulfonate or metal alkylsulfonate in combination with alkylbenzenesulfonic acid, because the dispersion of the polymer can be kept stable.

The particle size of the polyorganosiloxane rubber used in the present invention is not critical. However, an average particle size is preferably 0.1 to 0.5 μm, more preferably 0.15 to 0.3 μm. Whether the average particle size is beyond the upper limit or below the lower limit of the above range, the impact resistance of the polyarylene sulfide resin composition tends to lower. The average particle size of the polyorganosiloxane rubber can be controlled by properly selecting a condition wherein water and the mixture of the organosiloxanes are shear-mixed before the polymerization.

The polyorganosiloxane rubber needs to be added in an amount of 1 to 40 parts by weight based on 99 to 60 parts by weight of the polyarylene sulfide resin. When the amount is less than 1 part by weight, development of the impact resistance of the resin tends to become insufficient, and when it exceeds 40 parts by weight, heat resistance tends to lower.

The organosilane compound having an isocyanate group used in the present invention refers to a compound in which the isocyanate group has been bonded to at least one alkyl group bonded to the silicon atom. Any compound of such a form may be used, but an organosilane compound represented by the following formula,

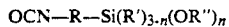

OCN—R—Si(R')$_{3-n}$(OR")$_n$ wherein R represents a $C_1$-$C_{10}$ alkylene group, each of R' and R" represents a methyl or ethyl group, and n represents an integer of 1 to 3, may be mentioned as a preferred one. These organosilane compounds may be used alone or in admixture of two or more.

Preferred examples of the organosilane compound include γ-isocyanate propyltrimethoxysilane, γ-isocyanate propyltriethoxysilane, γ-isocyanate propylmethyldimethoxysilane, γ-isocyanate propylmethyldiethoxysilane, etc.

This organosilane compound is added in an amount of 0.01 to 10 parts by weight based on 100 parts by weight of the total weight of the polyarylene sulfide resin and polyorganosiloxane rubber, and then reacted with these components. This reaction may be of any form as far as it is carried out in a mixed state of these components. However, a reaction form of extruding the mixture of these components through an extruder is preferred, because the reaction can simply be carried out at the step of pelletizing. When the amount of the organosilane compound is below the lower limit of the above mentioned range, development of the impact strength tends to become insufficient, and when it exceeds the upper limit of the above mentioned range, flowability tends to lower.

The composition of the present invention may contain a filler as an additional component.

The filler may have any form of fibrous forms, powdery forms, granular forms and others. Examples of the filler include glass fibers, carbon fibers, potassium titanate, asbestos, silicon carbide, ceramics fibers, metal fibers, silicon nitride, aramide fibers, barium sulfate, calcium sulfate, ferrite, calcium silicate, calcium carbonate, magnesium carbonate, antimony trioxide, zinc oxide, titanium oxide, magnesium oxide, iron oxide, molybdenum disulfide, mica, talc, kaolin, pyrophyllite, bentonite, sericite, zeolite, attapulgite, wollastonite, dolomite, other clays, graphite, gypsum, glass beads, quartz, etc. When these fillers are used, their amount is preferably 300 wt. % or less based on the total amount of the components, i.e. the polyarylene sulfide resin (A), polyorganosiloxane rubber (B) and organosilane compound (C). When the amount exceeds 300 wt. %, the melt-flowability of the composition becomes poor, and therefore the appearance of the molded product undesirably tends to be lowered. When these reinforcing materials and fillers are used, a known silane coupling agent can be used.

Into the composition of the present invention may be incorporated, if necessary, a mold-release agent, coloring agent, heat stabilizer, ultraviolet ray absorber, foaming agent, rust preventive, flame retardant, flame retarding assistant, etc., so far as the characteristics of the present composition are not much injured.

In the present invention, the degree of swelling of the polyorganosiloxane rubber can be measured by the following method:

A polyorganosiloxane rubber latex is added to about 3 to 5 times by weight, based on the polyorganosiloxane rubber, of isopropyl alcohol with stirring. Thus, the emulsion is broken and the rubber is coagulated to obtain a siloxane polymer. The polymer is washed with water and dried at 80° C. for 10 hours under reduced pressure. After drying, about 1 g of the polymer is accurately weighed, immersed in about 60 g of toluene and swollen by allowing it to stand at 25° C. for 100 hours. Thereafter, the residual toluene is removed by decantation. The swollen polymer is accurately weighed and dried at 80° C. for 16 hours under reduced pressure to vaporize the absorbed toluene. The dried polymer is again weighed accurately. The degree of swelling is calculated according to the following equation:

$$\text{Degree of swelling} = \frac{\begin{pmatrix}\text{Weight of}\\\text{swollen}\\\text{polymer}\end{pmatrix} - \begin{pmatrix}\text{Weight of}\\\text{dried}\\\text{polymer}\end{pmatrix}}{\text{(Weight of dried polymer)}} \times 100$$

The average particle size of the polyorganosiloxane rubber can be measured using an aqueous dilute dispersion of the rubber latex as a test dispersion, according to the quasi-elastic light scattering method (measuring apparatus, MALVERN SYSTEM 4600; measurement temperature, 25° C.; and scattering angle, 90°).

The present invention will be illustrated in more detail with reference to the following Examples. However, the present invention should not be construed to be restricted by the Examples.

In the Examples and Comparative Examples, Izod impact strength was measured according to ASTM D 256 (with ⅛' notch) and heat distortion temperature (HDT) was measured according to ASTM D 648 (with a load of 18.56 kg).

In Referential Examples, Examples and Comparative Examples, parts are by weight unless otherwise stated.

REFERENTIAL EXAMPLE 1

2 Parts of tetraethoxysilane and 98 parts of octamethylcyclotetrasiloxane were mixed to obtain 100 parts of an organosiloxane mixture. Separately, 1 part of sodium dodecylbenzenesulfonate and 1 part of dodecylbenzenesulfonic acid were dissolved in 200 parts of distilled water. To the aqueous solution was added 100 parts of the above organosiloxane mixture. The obtained mixture was preliminarily stirred at 10,000 rpm with a homomixer, and emulsified and dispersed by passing it three times through a homogenizer under a pressure of 200 kg/cm². Thus, an organosiloxane latex was obtained. This latex was transferred to a separable flask equipped with a condenser and a stirring blade, heated at 80° C. for 6 hours with stirring, and allowed to stand in a 10° C. atmosphere. After 20 hours, the pH of this latex was made 7 with an aqueous sodium hydroxide solution so as to complete polymerization, and thus an polyorganosiloxane rubber latex was obtained. The conversion of the resulting polyorganosiloxane rubber (S-1) was 91.2%, the average particle size thereof was 0.23 μm, and the degree of swelling thereof was 23.

EXAMPLE 1

A powdery polyphenylene sulfide resin (Tohpren T-4 produced by Tohpren Co., Ltd.; average particle size, 50 μm) was added to 500 parts of the polyorganosiloxane rubber latex obtained in Referential Example 1 with stirring. Thus, a dispersion was prepared. This dispersion was coagulated by adding it dropwise to 600 parts of 1 wt. % aqueous calcium chloride solution. The coagulated product was separated, washed and dried at 80° C. for 10 hours to obtain a polyphenylene sulfide resin in which the polyorganosiloxane rubber had been dispersed. To this resin were added 1 part of γ-isocyanate propyltrimethoxysilane (KBM 9007 produced by Shin-Etsu Chemical Co., Ltd.) ((a) in Table 1) and the powdery polyphenylene sulfide resin of such an amount that the content of the polyorganosiloxane rubber became 20 parts per 80 parts of the resin. The mixture was mixed on a Henschel mixer, extruded through a twin-screw extruder (Werner 30φ produced by Werner & Pfleiderer Co.) at a barrel temperature of 310° C. and pelletized on a pelletizer. The resulting pellets were molded on an injection molding machine (IS-100 produced by Toshiba Machine Co., Ltd.) at a cylinder temperature of 310° C. and a mold temperature of 140° C. to prepare test pieces for evaluation. Evaluation was carried out with these test pieces. The results are shown in Table 1.

EXAMPLES 2 TO 15

Pellets were prepared in the same manner as in Example 1 except that the polyorganosiloxane rubber (S-1) prepared in Referential Example 1 and γ-isocyanate propyltrimethoxysilane ((a) in Table 1), γ-isocyanate propylmethyldimethoxysilane (KBM 9207 produced by Shin-Etsu Chemical Co., Ltd.) ((b) in Table 1) or γ-isocyanate propyltriethoxysilane (KBE 9007 produced by Shin-Etsu Chemical Co., Ltd.) ((c) in Table 1) as an organosilane compound were blended in amounts shown in Table 1. Subsequently, the pellets were blended with a glass fiber (GF in Table 1) or a carbon fiber (CF in Table 1) in amounts shown in Table 1. Using the resulting blend, the test pieces were prepared in the same manner as in Example 1. Evaluation was carried out with these test pieces. The results are shown in Table 1.

TABLE 1

| Example | Rubber Type | Rubber Part | PPS (part) | Organosilane compound Kind | Organosilane compound Part | Filler Kind | Filler Part | Izod impact strength (kg · cm/cm) | HDT (°C.) |
|---|---|---|---|---|---|---|---|---|---|
| 1 | S-1 | 20 | 80 | (a) | 1 | — | — | 32 | 108 |
| 2 | S-1 | 20 | 80 | (a) | 1 | GF | 67 | 19 | 252 |
| 3 | S-1 | 20 | 80 | (a) | 1 | GF | 43 | 20 | 251 |
| 4 | S-1 | 20 | 80 | (a) | 1 | GF | 150 | 16 | 254 |
| 5 | S-1 | 20 | 80 | (a) | 1 | GF | 67 | 19 | 250 |
| 6 | S-1 | 20 | 80 | (a) | 1 | GF | 67 | 19 | 252 |
| 7 | S-1 | 10 | 90 | (a) | 1 | GF | 67 | 13 | 256 |
| 8 | S-1 | 5 | 95 | (a) | 1 | GF | 67 | 11 | 259 |
| 9 | S-1 | 2.5 | 97.5 | (a) | 1 | GF | 67 | 11 | 261 |
| 10 | S-1 | 30 | 70 | (a) | 1 | GF | 67 | 22 | 235 |
| 11 | S-1 | 20 | 80 | (b) | 1 | GF | 67 | 19 | 251 |
| 12 | S-1 | 20 | 80 | (c) | 1 | GF | 67 | 19 | 250 |
| 13 | S-1 | 20 | 80 | (a) | 1 | CF | 43 | 10 | 250 |
| 14 | S-1 | 20 | 80 | (a) | 0.5 | GF | 67 | 20 | 252 |
| 15 | S-1 | 20 | 80 | (a) | 5 | GF | 67 | 18 | 250 |

Note: PPS: Polyplenylene sulfide

COMPARATIVE EXAMPLES 1 TO 12

Compositions were prepared according to Table 2. Using these compositions, test pieces were prepared and evaluated in the same manner as in Example 1 for Comparative Examples 1, 5, 9 and 10, and in Example 2 for Comparative Examples 2 to 4, 6 to 8, 11 and 12. The results are shown in Table 2. In Comparative Example 10, the viscosity of the melted composition was too high for extrusion.

In Table 2, (a), GF and CF are as defined above, (d) is γ-aminopropyltriethoxysilane (KBE 903 produced by Shin-Etsu Chemical Co., Ltd.) and (e) is γ-mercaptopropyltrimethoxysilane (KBM 803 produced by Shin-Etsu Chemical Co., Ltd.).

TABLE 2

| Comparative Example | Rubber Type | Rubber Part | PPS (part) | Organosilane compound Kind | Organosilane compound Part | Filler Kind | Filler Part | Izod impact strength (kg · cm/cm) | HDT (°C.) |
|---|---|---|---|---|---|---|---|---|---|
| 1 | — | — | 100 | — | — | — | — | 2 | 115 |
| 2 | — | — | 100 | — | — | GF | 67 | 8 | 265 |
| 3 | — | — | 100 | — | — | GF | 43 | 7 | 265 |
| 4 | — | — | 100 | — | — | GF | 150 | 6 | 266 |
| 5 | S-1 | 20 | 80 | — | — | — | — | 6 | 103 |
| 6 | S-1 | 20 | 80 | — | — | GF | 67 | 9 | 250 |
| 7 | — | — | 100 | (a) | 1 | GF | 67 | 8 | 263 |
| 8 | — | — | 100 | — | — | CF | 43 | 3 | 260 |
| 9 | — | — | 100 | (a) | 1 | — | — | 2 | 113 |
| 10 | S-1 | 20 | 80 | (a) | 20 | — | — | Unextrudable | |
| 11 | S-1 | 20 | 80 | (d) | 1 | GF | 67 | 6 | 250 |
| 12 | S-1 | 20 | 80 | (e) | 1 | GF | 67 | 5 | 250 |

REFERENTIAL EXAMPLE 2

Polyorganosiloxane rubbers (S-2 to S-11) were prepared in the same manner as in Referential Example 1 except that the mixing ratio of tetraethoxysilane to octamethylcyclotetrasiloxane, the pressure in the homogenizer and the number of passages through the homogenizer were as described in Table 3.

TABLE 3

| | Tetraethoxysilane (part) | Octamethylcyclotetrasiloxane (part) | Homogenizer Pressure (kg/cm²) | Homogenizer Number of passages | Conversion (%) | Degree of swelling | Particle size (μm) |
|---|---|---|---|---|---|---|---|
| S-2 | 2 | 98 | 200 | 1 | 91 | 22 | 0.28 |
| S-3 | 2 | 98 | 200 | 5 | 91 | 23 | 0.20 |
| S-4 | 2 | 98 | 100 | 1 | 91 | 23 | 0.33 |
| S-5 | 2 | 98 | 350 | 5 | 91 | 23 | 0.13 |
| S-6 | 1 | 99 | 200 | 3 | 91 | 34 | 0.24 |
| S-7 | 5 | 95 | 200 | 3 | 91 | 6 | 0.23 |
| S-8 | 0.5 | 99.5 | 200 | 3 | 91 | 42 | 0.25 |
| S-9 | 15 | 85 | 200 | 3 | 91 | 1 | 0.23 |
| S-10 | 0.3 | 99.7 | 200 | 3 | 91 | 60 | 0.26 |
| S-11 | 2 | 98 | 350 | 10 | 91 | 23 | 0.05 |

EXAMPLES 16 TO 25

Test pieces were prepared and evaluated in the same manner as in Example 2 except that (S-2) to (S-11) obtained in Referential Example 2 were used as the polyorganosiloxane rubber. The results are shown in Table 4.

EXAMPLE 26

Test pieces were prepared and evaluated in the same manner as in Example 2 except that a silicone resin fine powder having a particle size of 1 to 2 μm (X-52-590A produced by Shin-Etsu Chemical Co., Ltd.) (S-12) was used as a polyorganosiloxane rubber. The results are shown in Table 4.

TABLE 4

| Example | Rubber Type | Rubber Part | PPS (part) | Organosilane compound Kind | Organosilane compound Part | Filler (GF) Part | Izod impact strength (kg · cm/cm) | HDT (°C.) |
|---|---|---|---|---|---|---|---|---|
| 16 | S-2 | 20 | 80 | (a) | 1 | 67 | 18 | 252 |
| 17 | S-3 | 20 | 80 | (a) | 1 | 67 | 17 | 251 |
| 18 | S-4 | 20 | 80 | (a) | 1 | 67 | 18 | 252 |
| 19 | S-5 | 20 | 80 | (a) | 1 | 67 | 15 | 252 |
| 20 | S-6 | 20 | 80 | (a) | 1 | 67 | 19 | 251 |
| 21 | S-7 | 20 | 80 | (a) | 1 | 67 | 14 | 252 |
| 22 | S-8 | 20 | 80 | (a) | 1 | 67 | 14 | 251 |
| 23 | S-9 | 20 | 80 | (a) | 1 | 67 | 10 | 251 |
| 24 | S-10 | 20 | 80 | (a) | 1 | 67 | 10 | 251 |
| 25 | S-11 | 20 | 80 | (a) | 1 | 67 | 10 | 251 |
| 26 | S-12 | 20 | 80 | (a) | 1 | 67 | 10 | 250 |

EXAMPLES 27 TO 30 AND COMPARATIVE EXAMPLES 13 TO 17

Procedure was carried out in the same manner as in Example 2 except that, as a filler, powdery silica and talc were used alone or in admixture of one of them with a glass fiber. Further, for the purpose of comparison, blends of these fillers and the polyphenylene sulfide resin were prepared in the same manner as in Example 2 except that no rubber was used, and evaluation was carried out. The results are shown in Table 5.

TABLE 5

| | Rubber (S-1) (part) | PPS (part) | Organosilane compound (a) (part) | Filler (part) GF | Filler (part) Powdery silica | Filler (part) Talc | Izod impact strength (kg · cm/cm) | HDT (°C.) |
|---|---|---|---|---|---|---|---|---|
| Example 27 | 20 | 80 | 1 | | 33 | | 8 | 190 |
| Example 28 | 20 | 80 | 1 | | | 33 | 8 | 188 |
| Comparative Example 13 | — | 100 | 1 | | 33 | | 2 | 203 |
| Comparative Example 14 | — | 100 | 1 | | | 33 | 2 | 205 |
| Example 29 | 20 | 80 | 1 | 33 | 33 | | 18 | 252 |
| Example 30 | 20 | 80 | 1 | 33 | | 33 | 17 | 252 |
| Comparative Example 15 | — | 100 | 1 | 33 | 33 | | 5 | 262 |
| Comparative Example 16 | — | 100 | 1 | 33 | | 33 | 5 | 263 |

EXAMPLE 31

Blending, extrusion, pelletizing, molding and evaluation were carried out in the same manner as in Example 1 except that 1 part of γ-isocyanate propylmethyldiethoxysilane was used as the organosilane compound. As a result, Izod impact strength was 30 kg.cm/cm, and HDT was 108° C.

EXAMPLE 32

Blending, extrusion, pelletizing, molding and evaluation were carried out in the same manner as in Example 1 except that 1 part of ε-isocyanate pentyltrimethoxysilane was used as the organosilane compound. As a result, Izod impact strength was 30 kg.cm/cm, and HDT was 107° C.

EXAMPLES 33 AND 34

Pellets were prepared and injection-molding and evaluation were carried out, in the same manner as in Examples 1 and 2 except that the polyphenylene sulfide resin was replaced by a straight chain-type one (M-2588 produced by Toray Phillips Co.). The results are shown in Table 6.

TABLE 6

| Example | Izod impact strength (kg · cm/cm) | HDT (°C.) |
|---|---|---|
| 33 | 38 | 108 |
| 34 | 23 | 253 |

What is claimed is:

1. A polyarylene sulfide resin composition obtained by mixing (A) 99 to 60 parts by weight of a polyarylene sulfide resin,
(B) 1 to 40 parts by weight of a polyorganosiloxane rubber,
(C) 0.01 to 10 parts by weight, based on 100 parts by weight of the total weight of the components (A) and (B), of an organosilane compound having an isocyanate group, and
(D) 0 to 300 wt. %, based on the total weight of the components (A), (B) and (C), of a filler, and then reacting these components.

2. A polyarylene sulfide resin composition according to claim 1, wherein the polyarylene sulfide resin is a polyphenylene sulfide resin.

3. A polyarylene sulfide resin composition according to claim 1, wherein the organosilane compound having an isocyanate group is a compound represented by the formula:

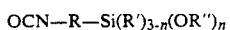

$$OCN-R-Si(R')_{3-n}(OR'')_n$$

wherein R represents a $C_1$-$C_{10}$ alkylene group, each of R' and R'' represents a methyl or ethyl group, and n represents an integer of 1 to 3.

4. A polyarylene sulfide resin composition according to claim 1, wherein the organosilane compound having an isocyanate group is at least one member selected from the group consisting of γ-isocyanate propyltrimethoxysilane, γ-isocyanate propyltriethoxysilane, γ-isocyanate propylmethyldimethoxysilane and γ-isocyanate propylmethyldiethoxysilane.

5. A polyarylene sulfide resin composition according to claim 1, wherein the polyorganosiloxane rubber has a degree of swelling of 3 to 50 measured by immersing in toluene and a particle form of 0.1 to 0.5 μm in an average particle size.

6. A polyarylene sulfide resin composition according to claim 1, wherein the filler is a glass fiber or a carbon fiber.

* * * * *